(12) United States Patent
Žitković

(10) Patent No.: US 12,420,735 B2
(45) Date of Patent: Sep. 23, 2025

(54) TRIM PART

(71) Applicant: BUGATTI RIMAC LLC, Sveta Nedjelja (HR)

(72) Inventor: Zlatko Žitković, Gornji Stupnik (HR)

(73) Assignee: BUGATTI RIMAC LLC, Sveta Nedjelja (HR)

( * ) Notice: Subject to any disclaimer, the term of this patent is extended or adjusted under 35 U.S.C. 154(b) by 0 days.

(21) Appl. No.: 18/541,342

(22) Filed: Dec. 15, 2023

(65) Prior Publication Data

US 2024/0208450 A1    Jun. 27, 2024

(30) Foreign Application Priority Data

Dec. 23, 2022  (EP) .................................... 22216475

(51) Int. Cl.
*B60R 21/2165* (2011.01)
*B29C 70/44* (2006.01)
(Continued)

(52) U.S. Cl.
CPC ........ *B60R 21/2165* (2013.01); *B29C 70/443* (2013.01); *B29C 70/54* (2013.01);
(Continued)

(58) Field of Classification Search
CPC ...... B60R 21/2165; B60R 2021/21537; B60R 21/215; B29C 70/443; B29C 70/54;
(Continued)

(56) References Cited

U.S. PATENT DOCUMENTS 5,979,931 A * 11/1999 Totani .................... B32B 3/266
280/743.1
6,199,897 B1 * 3/2001 Kreile ................ B60R 21/2165
280/732
(Continued)

FOREIGN PATENT DOCUMENTS

DE         10123353 A1 *  9/2002 ............. B29C 44/12
DE     102012220979 A1 *  5/2014 ....... B29C 45/14786
(Continued)

OTHER PUBLICATIONS

Bruening, DE-102019133499-A1, Machine Translation of Specification (Year: 2021).*
(Continued)

*Primary Examiner* — Drew J Brown
*Assistant Examiner* — Matthew Joseph Ganci
(74) *Attorney, Agent, or Firm* — Hodgson Russ LLP

(57) ABSTRACT

A trim part, in particular for covering an airbag in a vehicle, is provided. The trim part comprises at least one outer layer, at least one hinge layer comprising at least one first break line which forms a first part of a perimeter of a flap area and is attached to a first surface of the at least one outer layer, at least one structural layer attached to a first surface of the at least one hinge layer facing away from the at least one outer layer characterized in that at least one of the at least one outer layer comprises a fiber composite material and the at least one structural layer comprises at least one second break line forming a breakthrough area corresponding to the flap area of the at least one hinge layer.

20 Claims, 8 Drawing Sheets

(51) Int. Cl.
- *B29C 70/54* (2006.01)
- *B29K 307/04* (2006.01)
- *B29L 31/30* (2006.01)
- *B32B 3/30* (2006.01)
- *B32B 5/02* (2006.01)
- *B32B 5/26* (2006.01)
- *B32B 7/022* (2019.01)
- *B32B 15/14* (2006.01)
- *B29K 277/00* (2006.01)
- *B29L 9/00* (2006.01)

(52) U.S. Cl.
CPC .......... *B32B 3/30* (2013.01); *B32B 5/02* (2013.01); *B32B 5/26* (2013.01); *B32B 7/022* (2019.01); *B32B 15/14* (2013.01); *B29K 2277/10* (2013.01); *B29K 2307/04* (2013.01); *B29L 2009/00* (2013.01); *B29L 2031/3038* (2013.01); *B32B 2260/021* (2013.01); *B32B 2260/046* (2013.01); *B32B 2262/106* (2013.01); *B32B 2307/54* (2013.01); *B32B 2307/714* (2013.01); *B32B 2605/003* (2013.01)

(58) Field of Classification Search
CPC ......... B29C 37/0057; B32B 3/30; B32B 5/02; B32B 5/26; B32B 7/022; B32B 15/14; B32B 2260/021; B32B 2260/046; B32B 2262/106; B32B 2307/54; B32B 2307/714; B32B 2605/003; B32B 3/10; B32B 3/266; B32B 2262/0269; B29K 2277/10; B29K 2307/04; B29L 2031/3038; B29L 2009/00

See application file for complete search history.

(56) References Cited

U.S. PATENT DOCUMENTS

| | | | |
|---|---|---|---|
| 9,821,748 B2* | 11/2017 | Takahashi | ........... B60R 21/2165 |
| 10,703,318 B2 | 7/2020 | Patnala et al. | |
| 2018/0200987 A1* | 7/2018 | Arvidson | ................ B32B 25/12 |

FOREIGN PATENT DOCUMENTS

| | | | | |
|---|---|---|---|---|
| DE | 102019133499 A1 | * | 6/2021 | ............... B26D 3/00 |
| JP | H09175308 A | * | 7/1997 | |
| WO | 2004076233 | | 9/2004 | |

OTHER PUBLICATIONS

Fischer, DE 102012220979 A1, Machine Translation of Specification (Year: 2014).*

Berunto, JP H09175308 A, Machine Translation of Specification (Year: 1997).*

Dannenhauer, DE-10123353-A1, Machine Translation of Specification (Year: 2002).*

EPO, Extended European Search Report for EP Application No. 22216475.8, Jun. 14, 2023.

* cited by examiner

TRIM PART

CROSS-REFERENCE TO RELATED APPLICATION

This application claims priority to European Patent Application No. 22216475.8, filed Dec. 23, 2022, the entire disclosure of which is incorporated herein by reference.

TECHNICAL FIELD

The present disclosure relates to the technical field of a trim part, in particular for covering an airbag in a vehicle, and a method for manufacturing the same.

BACKGROUND

In the technical field of airbag covers, various concepts and manufacturing methods are known.

In the prior art, requirements exist on the one hand to provide a stable trim part such as a side panel or part of a dashboard that covers the airbag behind it, and on the other hand to allow the airbag to open quickly and safely in the event of an accident and to protect the occupant. A common concept is to form a predetermined breaking point in a structural layer that allows the inflating airbag to penetrate through the panel covering the airbag at one or more locations. The predetermined breaking point can be created using various ways, for example, but not limited to, by machining the layers or by providing a groove on a substrate used to create the layers.

In general, layers that ensure the stability of the trim part may be covered with an additional outer decorative layer of foam, leather, or synthetic material to conceal the break line. Besides the fact that the use of an additional outer decorative layer aims to provide a visually attractive trim part, there is further the requirement that the additional outer decorative layer does not interfere with the inflating airbag.

Further, carbon fiber materials are becoming increasingly popular as decorative elements due to their elegant and sporty appearance. High strength and stiffness combined with low specific weight are further advantages of carbon fibers. Besides, the hardness of carbon fiber materials, which promises many advantages, may also limit the application of these materials for some purposes.

Thus, there is a need for further development of trim parts, in particular trim parts covering an airbag, with regard to increasing requirements in terms of passenger safety, visual design and new materials used in the vehicle interior, and a simplified, cost-effective, and a resource-saving manufacturing process.

SUMMARY

The present disclosure relates to a trim part, in particular for covering an airbag in a vehicle as defined in claim 1 and method for manufacturing a trim part, in particular for covering an airbag in a vehicle as defined in claim 14. The dependent claims depict advantageous embodiments of the present disclosure.

According to a first aspect of the present disclosure, a trim part, in particular for covering an airbag in a vehicle, is provided. The trim part comprises at least one outer layer, at least one hinge layer comprising at least one first break line which forms a first part of a perimeter of a flap area and is attached to a first surface of the at least one outer layer, at least one structural layer attached to a first surface of the at least one hinge layer facing away from the at least one outer layer characterized in that at least one of the at least one outer layer comprises a fiber composite material and the at least one structural layer comprises at least one second break line forming a breakthrough area corresponding to the flap area of the at least one hinge layer.

According to a second aspect, a method for manufacturing a trim part, in particular for covering an airbag in a vehicle, is provided. The method comprises providing a mould, forming a layer stack comprising placing at least one outer layer into the mould, placing at least one hinge layer comprising at least one first break line which forms a first part of a perimeter of a flap area on top of the at least one outer layer, placing at least one structural layer on top of the at least one hinge layer. The method comprises inserting the layer stack into a vacuum bag, connecting one or more resin tubes to the vacuum bag, inserting the vacuum bag into an autoclave machine, applying a predetermined pressure to the vacuum bag and heating the vacuum bag to a predetermined temperature, providing a vacuum inside the vacuum bag and enabling a flow of resin into the vacuum bag, and removing the trim part out of the vacuum bag. The method is characterized in that at least one of the at least one outer layer comprises fiber composite material and the at least one structural layer comprises at least one second break line forming a breakthrough area corresponding to the flap area of the at least one hinge layer.

An effect of the technique of the present specification is to provide a trim part, in particular for covering an airbag in a vehicle, and a method for manufacturing the same. This results in various advantages.

The techniques of the present disclosure allow the use of fiber composite materials as the outer layer for an airbag cover without increasing the risk of injury to occupants. The layer structure of the trim part may allow a closed outer layer that meets visual requirements in the interior, especially of a passenger car, and may enable an inflating airbag to reliably protect the occupants in case of an accident. A further advantage is that thanks to the flexible design of the shape of the trim part, various installation locations may be possible. For example, the trim part may be used in a side panel or in a dashboard. The layer design provides for a stable trim part at a low weight that also meets the visual and functional requirements in the interior. The lower weight of the trim part of the techniques disclosed herein compared to the prior art may reduce the risk of injury to the occupant.

Another advantage is the fact that a possible break line in a structural layer that enables the airbag to break through does not have to be covered with a decorative layer. This brings further advantages.

An advantage may be a reduced material and resource consumption, as for example an outer layer covered with dampening foam may be superfluous. This also may enable the weight to be reduced, which may offer advantages, especially in terms of lightweight construction of the vehicle. Furthermore, the trim part may be designed as a single component. Furthermore, the airbag chute does not have to be covered by an additional cover, as the trim part may serve as a cover. For example, an entire or part door lining can be manufactured as a single component that is appropriately modified in the layer construction only at the corresponding points where the airbag operates. This means that fewer sub-components have to be bonded or screwed together during the manufacturing process. This may streamline the manufacturing process, may ensure faster lead times, and may reduce manufacturing costs due to saved material and labor time. Further, the single trim part may be easily dismantled and replaced after an accident.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

FIG. 4-1 schematically illustrates an exemplary embodiment of a hinge layer of a trim part having a first break line having a C-shape;

FIG. 4-2 schematically illustrates an exemplary embodiment of a hinge layer of a trim part having a first break line having an H-shape;

FIG. 5-1 schematically illustrates an exemplary embodiment of a structural layer of a trim part having a second break line corresponding to the hinge layer of FIG. 4-1;

FIG. 5-2 schematically illustrates an exemplary embodiment of a structural layer of a trim part having a second break line corresponding to the hinge layer of FIG. 4-2;

FIG. 6-1 schematically illustrates an exemplary embodiment of an outer layer of a trim part comprising fiber composite material;

FIG. 6-2 schematically illustrates an exemplary embodiment of an outer layer of a trim part comprising fiber composite material with a first notch section and a second notch section;

FIG. 7-1 schematically illustrates an exemplary embodiment of a trim part before an airbag inflation in a perspective view;

FIG. 7-2 schematically illustrates an exemplary embodiment of a trim part after an airbag inflation in a perspective view;

DETAILED DESCRIPTION

References throughout the preceding specification to "one embodiment", "an embodiment", "one example" or "an example", "one aspect" or "an aspect" means that a particular feature, structure, or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Embodiments to provide a trim part, in particular for covering an airbag in a vehicle, and a method for manufacturing the same according to the present disclosure will be described in reference to the drawings as follows.

Figure 1:
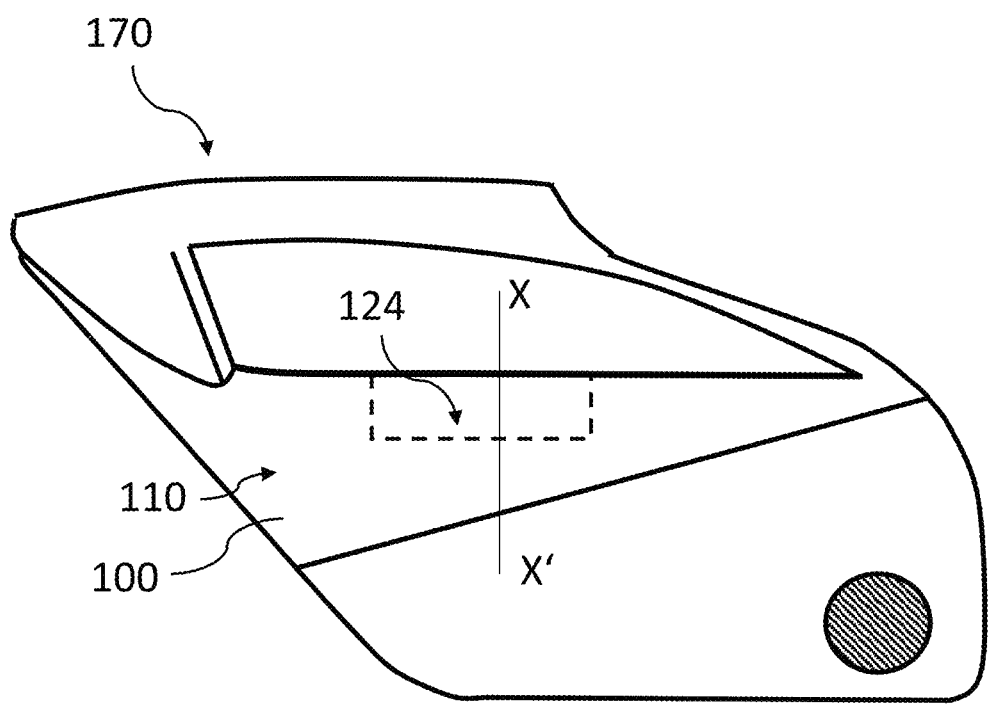
FIG. 1 schematically illustrates an exemplary embodiment of a trim part, in particular for covering an airbag in a vehicle, as part of a side door inside trim.

FIG. 1 schematically illustrates an exemplary embodiment of a trim part 100, in particular for covering an airbag in a vehicle, as part of a side door 170 inside trim.

Figure 2:
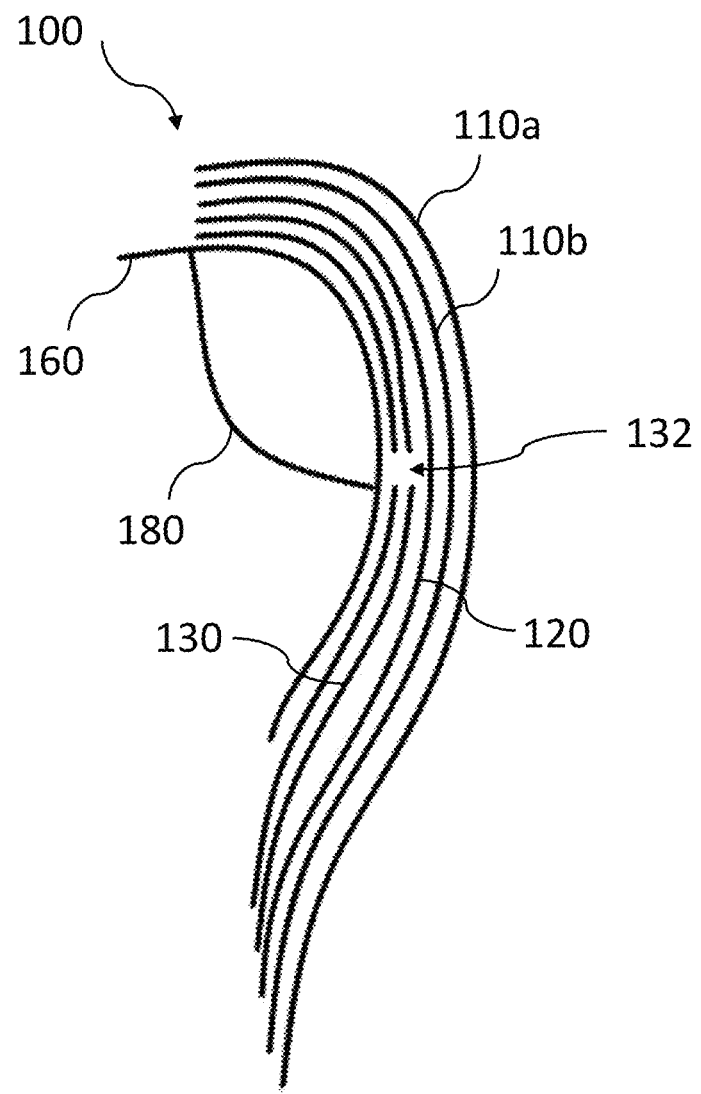
FIG. 2 schematically illustrates an exemplary embodiment of a trim part having two structural layers in a sectional view along the X-X' plane of FIG. 1.
Figure 3:
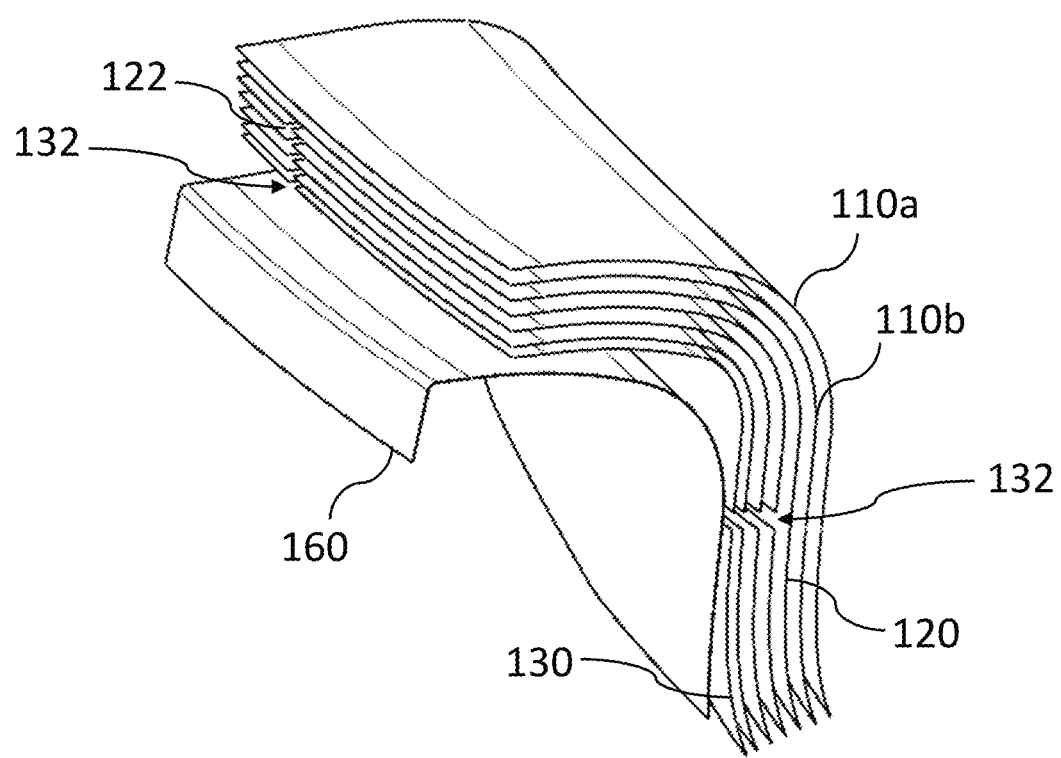
FIG. 3 schematically illustrates an exemplary embodiment of a trim part having four structural layers in a sectional perspective view along the X-X' plane of FIG. 1.

According to the first aspect, the trim part 100, in particular for covering an airbag in a vehicle comprises at least one outer layer 110. The at least one hinge layer 120 comprises at least one first break line 122 which forms a first part of a perimeter of a flap area 124 and is attached to a first surface of the at least one outer layer 110. Further, the trim part 100 comprises at least one structural layer 130 attached to a first surface of the at least one hinge layer 120 facing away from the at least one outer layer 110. The trim part 100 is characterized in that at least one of the at least one outer layer 110 comprises a fiber composite material and the at least one structural layer 130 comprises at least one second break line 132 forming a breakthrough area 134 corresponding to the flap area 124 of the at least one hinge layer 120. FIG. 2 schematically illustrates an exemplary embodiment of a trim part 100 having two structural layers in a sectional view along the X-X' plane of FIG. 1. In examples and as shown in the exemplary embodiment of FIG. 2, the number of the at least one outer layer 110 may be one, two, three, four, five, or more. FIG. 3 schematically illustrates an exemplary embodiment of the trim part 100 having four structural layers in a sectional perspective view along the X-X' plane of FIG. 1. The at least one outer layer 110 may face the interior of the vehicle e.g., may face the occupant of the vehicle. The at least one outer layer 110 may have a closed continuous surface with the underlying at least one first break line 122 not visible. As shown in FIG. 2, at least one hinge layer 120 may be attached to the first surface of the at least one outer layer 110 facing away from the interior of the vehicle. In examples, the at least one structural layer 130 may be configured to provide strength to the trim part 100.

In embodiments, the at least one of the at least one outer layer 110 comprising the fiber composite material may be configured to serve as a visual decorative layer. As mentioned above, an advantage of the techniques of the present disclosure is that no foam or any upholstered layer on the at least one outer layer 110 may be required. In examples, the at least one outer layer 110 may be thinner than the at least one hinge layer 120 and/or the at least one structural layer.

Figures 1, 4:
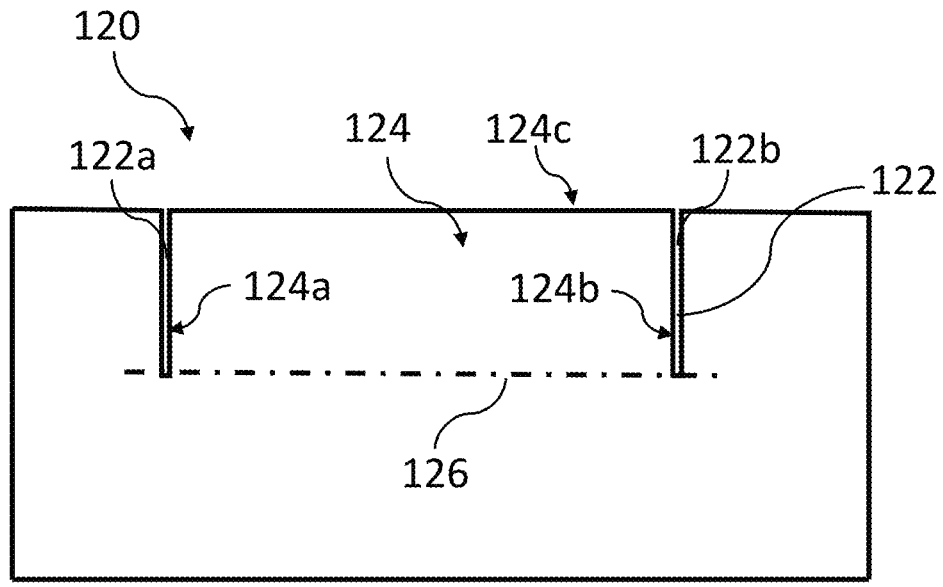
Figures 2, 4:
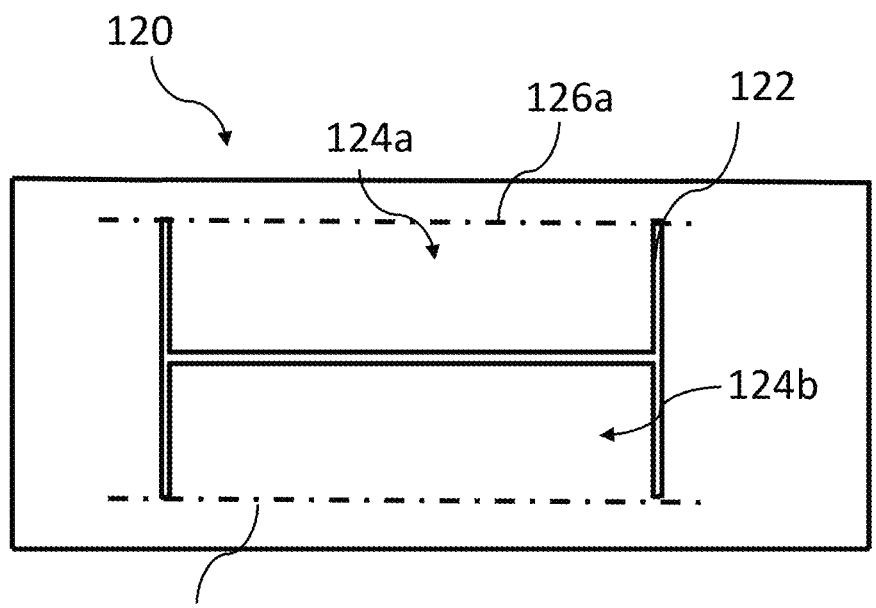
Figures 1, 7:
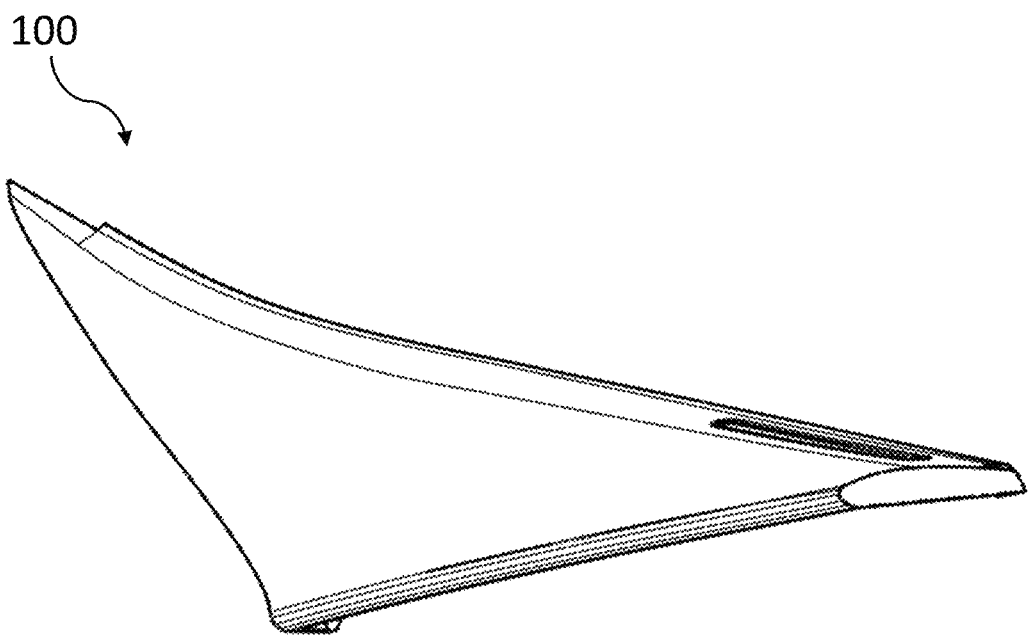
Figures 2, 7:
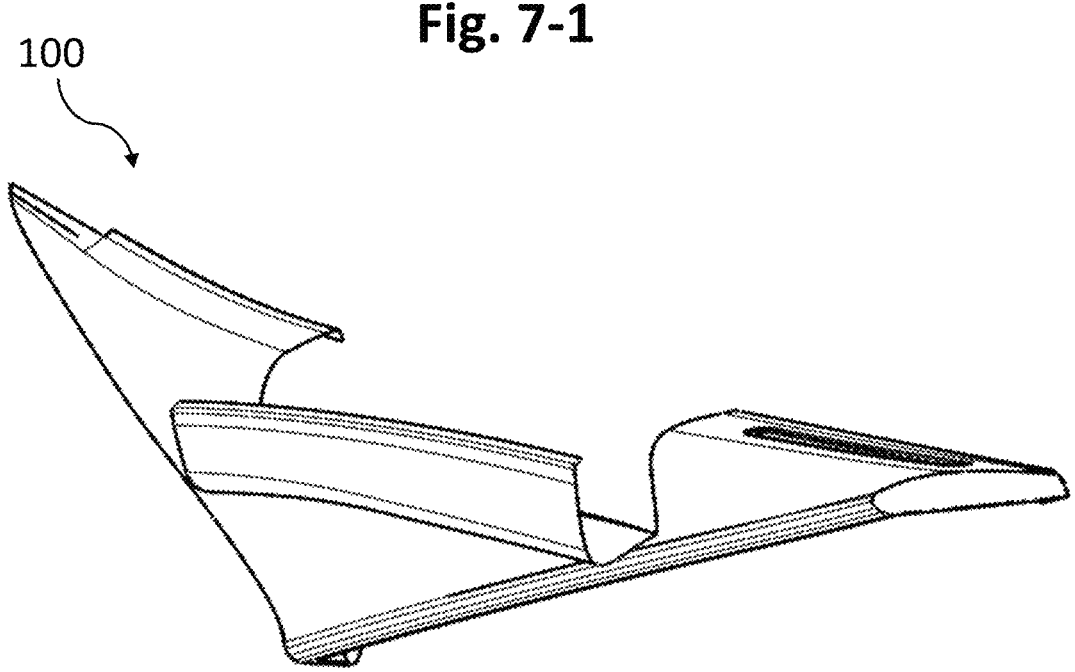

In embodiments, a second part of the perimeter of the flap area 124 which is not formed by the at least one break line 122 is configured to serve as rotation axis 126 for the flap area 124. FIG. 4-1 schematically illustrates an exemplary embodiment of the hinge layer 120 of the trim part 100 comprising the at least one first break line 122. In examples and as shown in the exemplary embodiment of FIG. 4-1, the at least one first break line 122 may comprise one or more incisions starting from an outer edge of the at least one hinge layer 120. In examples, the at least one first break line 122 may comprise one or more carvings. In examples, the at least one first break line 122 may serve to weaken the mechanical stability of the at least one hinge layer in areas defined by or associated with the at least one first break line 122. The second part of the perimeter of the flap area 124 which is not formed by the at least one break line 122 may not be mechanically weakened by an incision and/or any kind of carving. Therefore, the second part of the perimeter of the flap area 124 may serve as rotation axis 126 in order to provide a hinge effect. In examples, when a force is applied to the surface of the at least one hinge layer 120 facing away from the at least one outer layer 110, the flap area 124 may fold over along the rotation axis 126 towards the interior of the vehicle. Folding over the flap area 124 may expose a passageway for the inflating airbag. In examples, a length of a first and/or a second edge 124a, 124b of the flap area 124 may be shorter than a distance between a third edge 124c to a body of an occupant inside the vehicle when the flap area 124 is folded over. This may be advantageous to reduce the risk of injury to the occupant. In embodiments, the at least one outer layer 110 may be configured to be broken through by the flap area 124 when a force is applied to the flap area 124 wherein the force may be applied by the inflating airbag. FIG. 7-1 schematically illustrates an exemplary embodiment of the trim part 100 before an airbag inflation in a perspective view. FIG. 7-2 schematically illustrates an exemplary embodiment of the trim part 100 after the airbag inflation showing the flap area 124 in a perspective view. In examples, the force applied by the inflating airbag needs to be high enough to overcome the breaking stress of the at least one outer layer 110. In examples, when the number of the at least one outer layer 110a, 110b is two or more, each single layer of the two or more outer layers 110a, 110b may be configured to be broken through by the flap area 124 when the force is applied to the flap area 124 by the inflating airbag.

In examples, the at least one first break line 122 may be C-shaped, at least partially circular shaped, triangular shaped, linear shaped, polygonal shaped, or H-shaped. FIG. 4-1 shows an exemplary embodiment of the at least one hinge layer 120 comprising at least one first break line 122 being C-shaped. FIG. 4-2 shows an exemplary embodiment of the at least one first break line 122 being H-shaped. In examples, the second part of the perimeter of the flap area 124 which is not formed by the at least one first break is configured to serve as multiple rotation axis 126a, 126b. In the exemplary embodiment of FIG. 4-2 the flap area 124 comprises a first partial flap area 124a and a second partial flap area 124b. A first rotation axis 126a and a second rotation axis 126b may provide the hinge effect for the first partial flap area 124a or the second partial flap area 124b, respectively. The first rotation axis 126a may allow rotation of the first partial flap area 124a in a first rotational direction. The second rotation axis 126b may allow rotation of a second partial flap area 125b in a second rotational direction which is opposite the first direction.

In accordance with another aspect of the present disclosure a trim part (100) for covering an airbag in a vehicle is disclosed. The trim part (100) comprises at least one outer layer, such as the one outer layer (110), at least one hinge layer, such as hinge layer (120), forming at least a part of a flap area, such as flap area (124), and is attached to a first surface of the at least one outer layer (110), at least one structural layer, such as structural layer (130), attached to a first surface of the at least one hinge layer (120) facing away from the at least one outer layer (110). The at least one of the at least one outer layer (110) comprises a fiber composite material. The at least one structural layer (130) comprises at least one break line, such as the break line (132) forming a breakthrough area, such as the breakthrough area (134) corresponding to the flap area (124) of the at least one hinge layer (120). The at least one outer layer (110) is configured to be broken through by the flap area (124) when a force is applied to the flap area (124), wherein the force is applied by the airbag during inflation thereof. Further, the individual layers are bonded to each other in such a way that the trim part (100) is a homogeneous part.

Figures 1, 5:
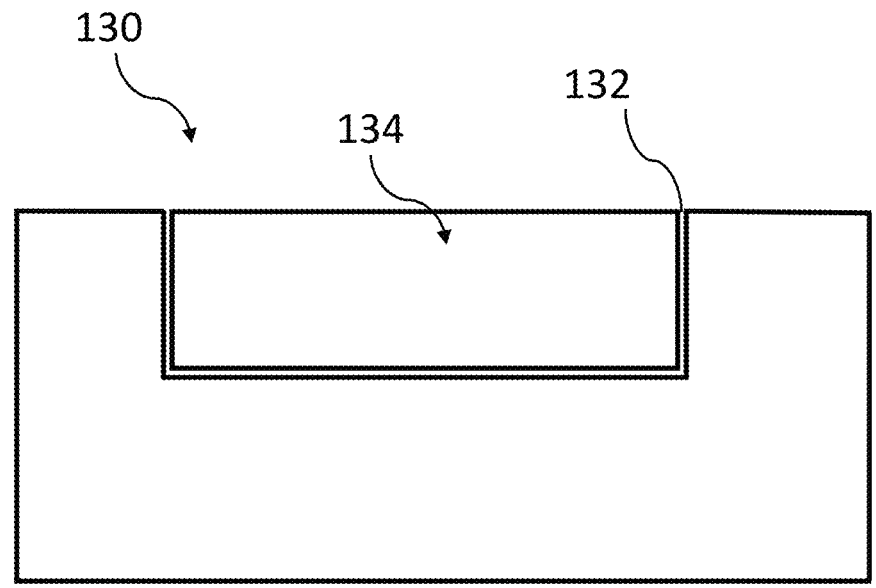
Figures 2, 5:
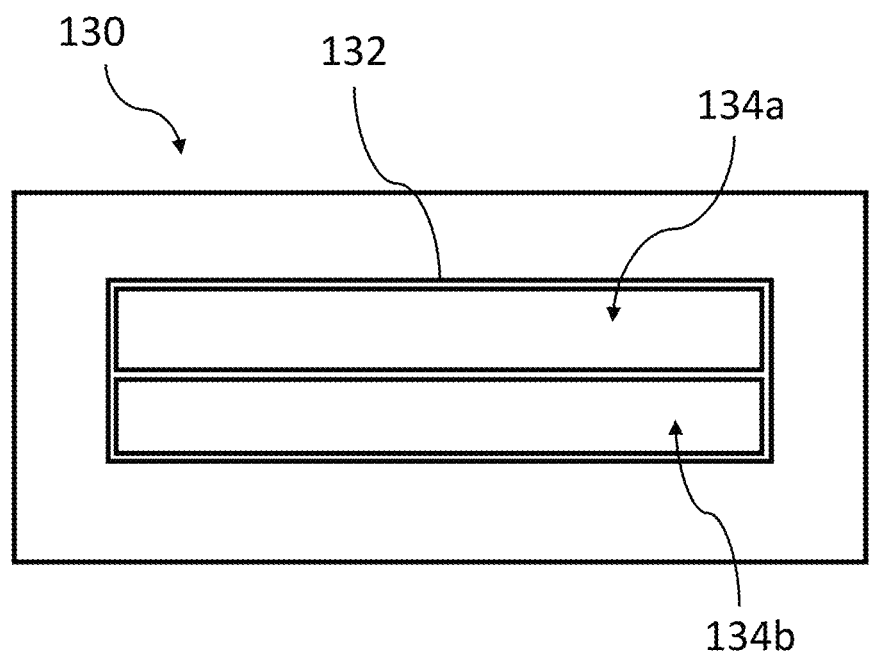

FIG. 5-1 schematically illustrates an exemplary embodiment of a structural layer 130 of a trim part 100 having a second break line 132 corresponding to the at least one hinge layer of FIG. 4-1. As shown in FIG. 5-1, the second break line 132 forms the breakthrough area 134. FIG. 5-2 schematically illustrates an exemplary embodiment of a structural layer of a trim part having a second break line 132 corresponding to the hinge layer 120 of FIG. 4-2. In exemplary embodiments and as shown in FIG. 5-2, the second break line 132 forms two partial breakthrough areas 134a, 134b. As shown, the contour of the breakthrough area 134 of the at least one structural layer 130 may correspond to the contour of the flap area 124 to provide a passageway for the inflating airbag. The force applied by the inflating airbag may be transferred to the flap area 124 of the hinge layer 120 over the breakthrough area 134 of the structural layer 130. In examples, the at least one first break line 122 and/or the at least one second break line 132 consists of one or more incisions. In examples, the at least one first break line 122 and/or the at least one second break line 132 may comprise carvings. In examples, the breakthrough area 134 of the at least one structural layer 130 may comprise one or more connecting webs in order to mechanically connect the breakthrough area 134 with the remaining part of the structural layer 130 during manufacturing. The one more connecting webs are configured to break when a force is applied to the breakthrough area 134 by the inflating airbag. In examples, the at least one first break line 122 consists of two side incisions from an outer edge of the trim part 100, as exemplary shown in FIG. 4-1. In examples, an imaginary axis between the ends of the two side incisions serves as the rotation axis 126.

In embodiments, the fiber composite material of the at least one of the at least one outer layer 110 may comprise visible carbon. In examples, the visible carbon may be any type of (but not limited to) T300, T300B, or T400HB, T700SC carbon fiber. In examples, the filament count of the visible carbon may be (but not limited to) 1000 per tow, 3000 per tow, 6000 per tow, 12000, or 24000 per tow. In examples, the fiber composite material may comprise natural fiber, glass fiber, polymer fiber, or aramid fiber.

In embodiments, the number of the at least one outer layer 110 may be at least two, and a first outer layer 110a may comprise carbon fibers and may be configured to serve as the visual decorative layer and a second outer layer 110b may comprise at least one of Kevlar, natural fiber, carbon fibers, polymer fiber, aramid, or a combination thereof. In examples, the second outer layer 110b may be configured to provide strength to the first outer layer 110a. This may be advantageous to provide a solid and stable interior lining and to prevent unintentional damage by the occupant of the vehicle. In examples, the carbon fibers may be aligned at an angle in a range from 0° to 45°. In examples, the second outer layer 110b may comprise carbon fibers, wherein the carbon fibers of the first outer layer 110a may be aligned at a first angle in a range from 0° to 45° and the carbon fibers of the second outer layer 110b may be aligned at a second angle other than the first angle in a range from 0° to 45°. In examples, the second outer layer 110b may comprise carbon fibers, wherein the carbon fibers of the first outer layer 110a may be aligned at 0° and the carbon fibers of the second outer layer 110b may be aligned at 45° or vice versa. This may be advantageous to increase stability and strength of the outer layer 110.

In embodiments, the at least one hinge layer 120 may comprise at least one of metal, Kevlar, natural fiber, nylon, fabric material, aramid, or a combination thereof. In examples, metal may comprise steel, aluminum, magnesium, or an alloy thereof. Kevlar may have the advantage of less weight compared to metal. In examples, the number of the at least one hinge layer 120 may be at least two. In examples, when the number of the at least one hinge layer 120 may be at least two, the material (e.g., metal, Kevlar, natural fiber, nylon, fabric material, aramid) of a first hinge layer of the at least two hinge layers may be the same or different to the material of the second hinge layer of the at least two hinge layers.

In embodiments, the trim part 100 may comprise a corrosion prevention layer 150 attached to the first surface and/or a second surface opposite the first surface of the at least one hinge layer 120, in particular when the at least one hinge layer 120 comprises metal. In examples, the corrosion prevention layer may comprise thin glass fibers. In examples, the corrosion prevention layer may comprise zinc. In examples, the corrosion prevention layer may be a coating of the surface and/or the second surface of the at least one hinge layer 120.

Figures 1, 6:
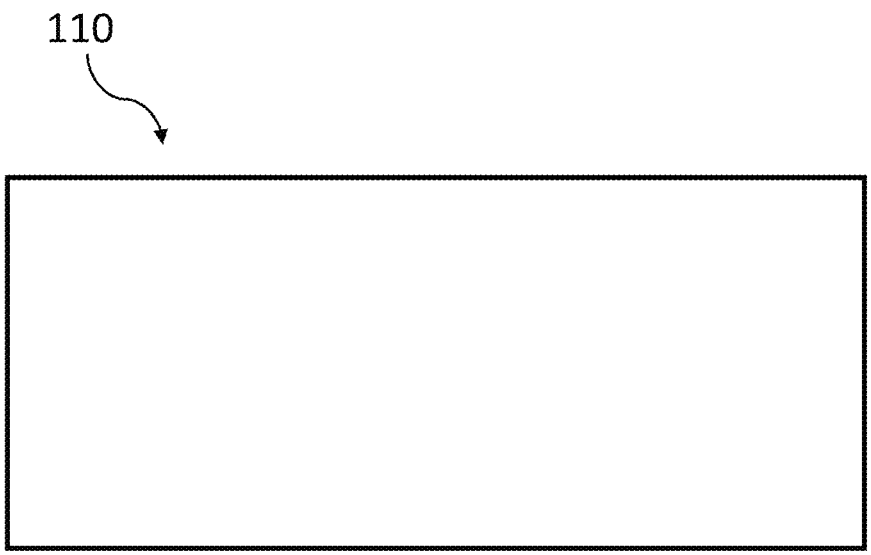
Figures 2, 6:
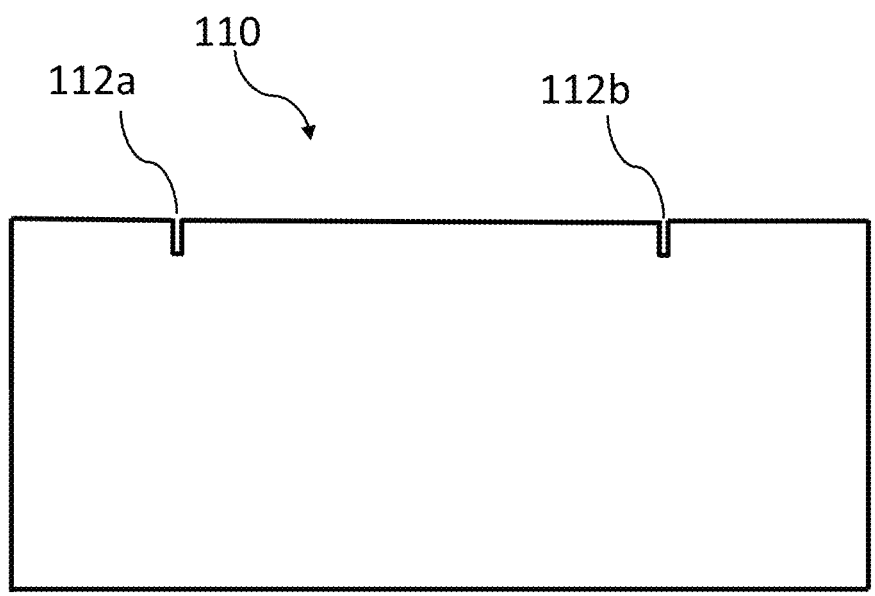

In examples, the at least one structural layer 130 may comprise structural carbon. In examples, the visible carbon may be (but not limited to) T800 carbon fiber. In examples, the filament count of the visible carbon may be (but not limited to) 6000 or 12000. In examples, the number of the at least one structural layer 130 may be at least two, at least three, or at least four. This may be advantageous to increase strength and stability of the trim part 100. An increased strength may be advantageous to prevent any damping character of the at least one structural layer 130 and to focus the energy of the inflating airbag towards the breakthrough area 134 and/or the flap area 124 which is advantageous to break through the at least one outer layer 110 and provide protection of the occupant through the inflating airbag. In examples, the carbon fibers of a first structural layer of at least two structural layers are aligned at a third angle in a range from 0° to 45° and the carbon fibers of a second structural layer of the at least two structural layers are aligned at a fourth angle other than the third angle in a range from 0° to 45°. In examples, the carbon fibers of the first structural layer of the at least two structural layers are aligned at 0° and the carbon fibers of the second structural layer of the at least two structural layers are aligned at 45° or vice versa. In examples, the carbon fibers of a first structural layer of two successive structural layers are aligned at the third angle in the range from 0° to 45° and the carbon fibers of a second structural layer of the two successive structural layers are aligned at the fourth angle other than the third angle in the range from 0° to 45°. In examples, the carbon fibers of a first structural layer of two successive structural layers are aligned by 0° and the carbon fibers of a second structural layer of the two successive structural layers are aligned by 45° or vice versa. In examples, a portion of the at least one structural layer 130 may be configured to focus the energy on the flap area 124 in order to break through the outer layer 110 when the airbag is inflated. In examples, the portion of the at least one structural layer 130 may comprise a strength that is higher than the strength of the remaining part of the structural layer 130 in order to pass the energy of the inflating airbag to the hinge layer 120. FIG. 6-1 schematically illustrates an exemplary embodiment of the at least one outer layer 110 of the trim part 100 comprising a fiber composite material. FIG. 6-2 schematically illustrates an exemplary embodiment of the at least one outer layer 110 of the trim part 100 comprising a fiber composite material with a first notch section 112a and a second notch section 112b.

In embodiments, the at least one break line 122 of the at least one hinge layer 120 may comprise the first partial break line 122a and the second partial break line 122b parallel to the first partial break line 122a. The first partial break line 122a may be separated from the second partial break line 122b by a fold line along the rotational axis 126, and may extend vertically therefrom. The at least one outer layer 110 may include a first notch section 112a aligned to a top portion of the first partial break line 122a and a second notch section 112b aligned to a top portion of the second partial break line 122b. The force applied by the inflating airbag may open the flap area 124 of the at least one hinge layer 120 causing the at least one outer layer 110 to break starting from the first notch section 112a and the second notch section 112b. This may be advantageous to reduce the force which is required to break through the at least one outer layer 110 and therefore may reduce the energy loss of the inflating airbag and may reduce the provisioning time of the airbag. In examples, the at least one first break line 122 and/or the at least one second break line 132 has a width in the range from 0 to 1 mm, from 1 mm to 2 mm, from 2 mm to 3 mm, from 3 mm to 4 mm, from 4 mm to 5 mm, or from 5 mm to 6 mm, from 6 mm to 10 mm, or from 0 mm to 20 mm. In examples, the at least one first break line 122 and/or the at least one second break line 132 may comprise an incision that cuts through the entire at least one hinge layer 120/at least one structural layer 130 or a carving that cuts only a partial thickness of the at least one hinge layer 120/at least one structural layer 130. This may be advantageous to mechanically weak the at least one hinge layer 120/the at least one structural layer at the location corresponding to the at least one first break line 122/the at least one second break line 132, respectively.

In embodiments, the airbag may be stored in an airbag holding space 180 comprising an opening facing the breakthrough area 134 of the at least one structural layer 130. FIG. 2 shows an exemplary location of the airbag holding space 180. In examples, the trim part 100 may serve as cover for the airbag holding space 180. This may avoid the need for an additional cover for the airbag holding space 180. This may be advantageous in view of reduced manufacturing costs and reduced weight. In embodiments, the trim part 100 may comprise a protective layer 160 attached to the at least one structural layer 130 and configured to protect the inflating airbag. In examples, the protective layer 160 may comprise polyvinyl chloride (PVC), poly-vinyl siloxane (PVS), polytetrafluoroethylene (PTFE), polyoxymethylene copolymer (POM-C). In examples, the trim part 100 may be configured to be arranged inside a vehicle, specifically in a motor vehicle, more specifically in a passenger vehicle, in order to protect the one or more occupants in the event of an accident. In examples, no decorative layer, specifically no upholstered decorative layer, on a second surface of the at least one outer layer 110 facing away from the at least one hinge layer 120 is required to conceal the at least one first break line 122. In embodiments, the trim part 100 is part of a side door 170, a pillar, and/or a dashboard of the vehicle. FIG. 1 schematically illustrates an exemplary embodiment of the trim part 100 as part of a side door 170 inside trim. In examples, the trim part 100 may be arranged inside the vehicle such that the inflating airbag protects the upper body of an occupant. In examples, the trim part 100 may cover the entire inner surface of a side door 170 of the vehicle. In examples, the trim part 100 may comprise cutouts, recesses, and/or attachment means for one or more electronic and/or mechanical control units for vehicle electronics, one or more windows, one or more parts of an entertainment system such as display devices and/or loudspeakers, and/or a navigation system. In examples, the trim part 100 may be part of a trim assembly comprising the trim part 100, one or more electronic and/or mechanical control units for vehicle electronics, one or more windows, one or more parts of an entertainment system such as display devices and/or loudspeakers, and/or a navigation system. In examples, the trim part 100 may comprise attachment means configured to allow the trim part 100 to be arranged inside the vehicle. In examples, the attachment means may comprise (but not limited to) screw and nut joints, threaded bolt and nut joints, threaded pins, plug-in pins, plug-in stems, or adhesive joints.

Figure 8:
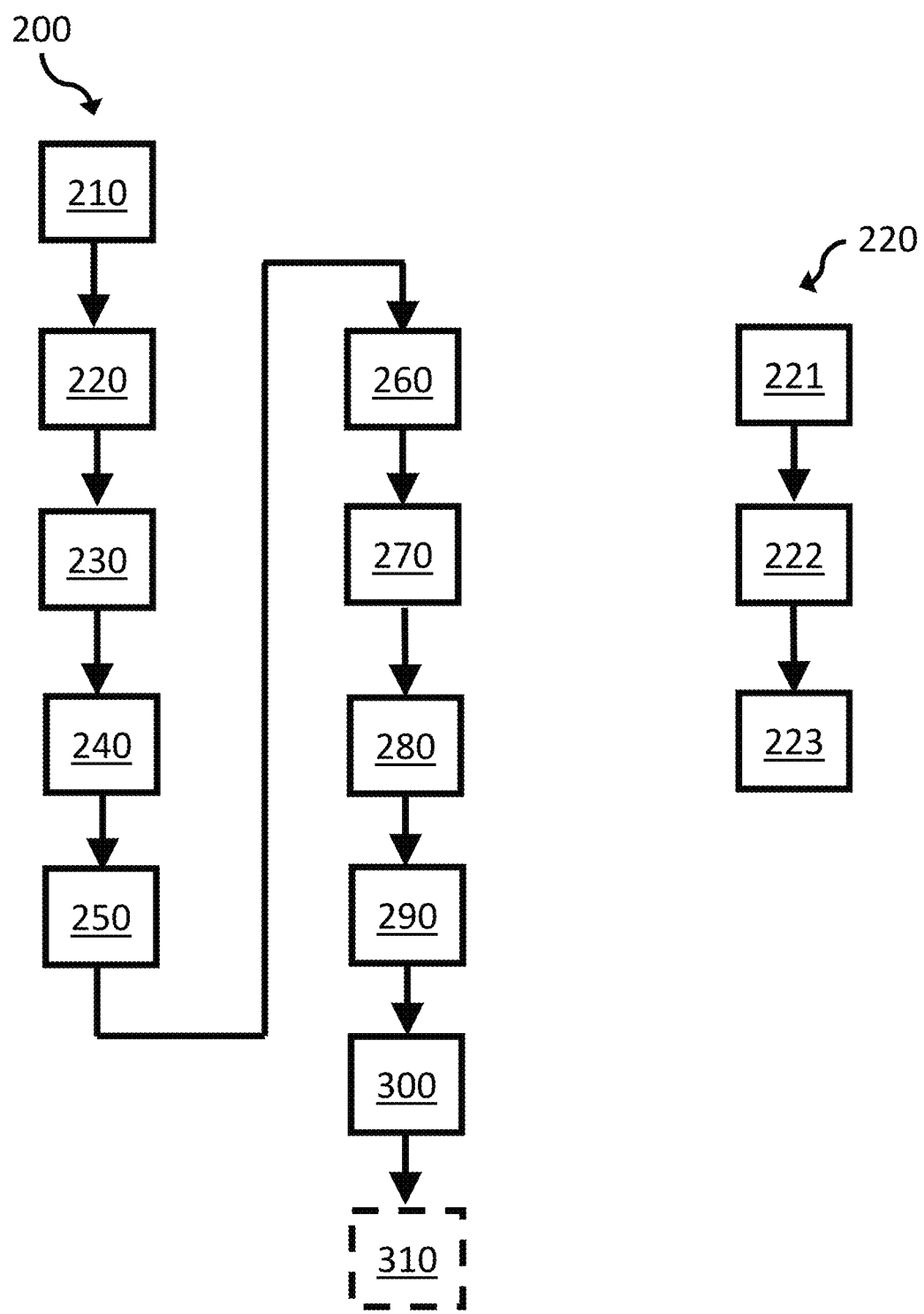
FIG. 8 schematically illustrates steps of a method for manufacturing a trim part, in particular for covering an airbag in a vehicle.

FIG. 8 schematically illustrates steps of a method 200 for manufacturing the trim part 100, in particular for covering an airbag in a vehicle.

According to the second aspect, the method 200 for manufacturing the trim part 100, in particular for covering an airbag in a vehicle, comprises providing 210 a mould. The method 200 comprises forming 220 a layer stack. The forming 220 comprises placing 221 at least one outer layer 110 into the mould, placing 222 at least one hinge layer 120 comprising at least one first break line 122 which forms a first part of a perimeter of a flap area 124 on top of the at least one outer layer 110, placing 223 at least one structural layer 130 on top of the at least one hinge layer 120. The method 200 comprises inserting 230 the layer stack into a vacuum bag, connecting 240 one or more resin tubes to the vacuum bag, inserting 250 the vacuum bag into an autoclave machine, applying 260 a predetermined pressure to the vacuum bag and heating 270 the vacuum bag to a predetermined temperature, providing 280 a vacuum inside the vacuum bag and enabling 290 a flow of resin into the vacuum bag, and removing 300 the trim part 100 out of the vacuum bag. In examples, after enabling 290 the flow of resin into the vacuum bag, the method may comprise waiting a predetermined time span before removing 300 the trim part 100. This may be advantageous to allow the individual layers to bond to each other in such a way that the trim part 100 becomes a homogenous part. The method 200 is characterized in that at least one of the at least one outer layer 110 comprises fiber composite material and the at least one structural layer 130 comprises at least one second break line 132 forming a breakthrough area 134 corresponding to the flap area 124 of the at least one hinge layer 120.

In embodiments, the method 200 may comprise bonding 310 the protective layer 160 on top of the at least one structural layer 130. In examples, the protective layer 160 may comprise polyvinyl chloride (PVC), poly-vinyl siloxane (PVS), polytetrafluoroethylene (PTFE), polyoxymethylene copolymer (POM-C). In examples, the at least one of the at least one outer layer 110 comprising the fiber composite material may be configured to serve as a visual decorative layer. In examples, the fiber composite material of the at least one of the at least one outer layer 110 may comprise visible carbon. In examples, a second part of the perimeter of the flap area 124 which is not formed by the at least one first break line 122 may be configured to serve as rotation axis 126 for the flap area 124. In examples, the at least one outer layer 110 may be configured to be broken through by the flap area 124 when a force is applied to the flap area 124. The force may be applied by an inflating airbag. In examples, the method 200 may serve to manufacture the trim part 100 according to the embodiments of the first aspect.

Furthermore, the particular features, structures, or characteristics can be combined in any suitable combinations and/or sub-combinations in one or more embodiments or examples.

Embodiments

1. A trim part 100, in particular for covering an airbag in a vehicle, comprising: at least one outer layer 110;
   at least one hinge layer 120 comprising at least one first break line 122 which forms a first part of a perimeter of a flap area 124 and is attached to a first surface of the at least one outer layer 110;
   at least one structural layer 130 attached to a first surface of the at least one hinge layer 120 facing away from the at least one outer layer 110, characterized in that
   at least one of the at least one outer layer 110 comprises a fiber composite material and the at least one structural layer 130 comprises at least one second break line 132 forming a breakthrough area 134 corresponding to the flap area 124 of the at least one hinge layer 120.
2. The trim part 100 according to embodiment 1, wherein the at least one of the at least one outer layer comprising the fiber composite material is configured to serve as a visual decorative layer.
3. The trim part 100 according to embodiment 1 or 2, wherein a second part of the perimeter of the flap area 124 which is not formed by the at least one first break line 122 is configured to serve as rotation axis 126 for the flap area 124.
4. The trim part 100 according to embodiments 1, 2, or 3, wherein the at least one outer layer 110 is configured to be broken through by the flap area 124 when a force is applied to the flap area 124 wherein the force is applied by an inflating airbag.
5. The trim part 100 according to any one of the preceding embodiments, wherein the at least one first break line 122 is C-shaped, at least partially circular shaped, triangular shaped, linear, polygonal shaped, or H-shaped.
6. The trim part 100 according to any one of the preceding embodiments, wherein the at least one first break line 122 and/or the at least one second break line 132 consists of one or more incisions.
7. The trim part 100 according to any one of the preceding embodiments, wherein the at least one first break line 122 consists of two side incisions from an outer edge of the trim part 100.
8. The trim part 100 according to any one of the preceding embodiments, wherein the fiber composite material of the at least one of the at least one outer layer 110 comprises visible carbon.
9. The trim part 100 according to any one of the preceding embodiments, wherein the number of the at least one outer layer 110 is at least two, and a first outer layer 110a comprises carbon fibers and is configured to serve as the visual decorative layer and a second outer layer 110b comprises at least one of Kevlar, natural fiber, carbon fibers, aramid, or a combination thereof.
10. The trim part 100 according to any one of the preceding embodiments, wherein the carbon fibers are aligned at an angle in a range from 0° to 45°.
11. The trim part 100 according to embodiment 9, wherein the second outer layer comprises carbon fibers, wherein the carbon fibers of the first outer layer are aligned at a first angle in a range from 0° to 45° and the carbon fibers of the second outer layer are aligned at a second angle other than the first angle in a range from 0° to 45°.
12. The trim part 100 according to any one of the preceding embodiments, wherein the at least one hinge layer 120 comprises at least one of metal, Kevlar, natural fiber, nylon, fabric material, aramid, or a combination thereof.

13. The trim part 100 according to any one of the preceding embodiments, further comprising a corrosion prevention layer 150 attached to the first surface and/or a second surface opposite the first surface of the at least one hinge layer 120, in particular when the at least one hinge layer 120 comprises metal.

14. The trim part 100 according to embodiment 13, wherein the corrosion prevention layer comprises thin glass fibers.

15. The trim part 100 according to any one of the preceding embodiments, wherein the at least one structural layer 130 comprises structural carbon.

16. The trim part 100 according to any one of the preceding embodiments, wherein the number of the at least one structural layer 130 is at least two, at least three, or at least four.

17. The trim part 100 according to embodiment 16, wherein the carbon fibers of a first structural layer of at least two structural layers are aligned at a third angle in the range from 0° to 45° and the carbon fibers of a second structural layer of the at least two structural layers are aligned at a fourth angle other than the third angle in the range from 0° to 45°.

18. The trim part 100 according to any one of the preceding embodiments, wherein the at least one structural layer 130 is configured to focus the energy on the flap area 124 in order to break through the outer layer 110 when the airbag is inflated.

19. The trim part 100 according to any one of the preceding embodiments, wherein the at least one break line 122 of the at least one hinge layer 120 comprises a first partial break line 122*a* and a second partial break line 122*b* parallel to the first partial break line 122*a*, wherein the first partial break line 122*a* is separated from the second partial break line 122*b* by a fold line along the rotational axis 126, and extend vertically therefrom, wherein the at least one outer layer 110 includes a first notch section 112*a* aligned to a top portion of the first partial break line 122*a* and a second notch section 112*b* aligned to a top portion of the second partial break line 122*b*, wherein the force applied by the inflating airbag opens the flap area 124 of the at least one hinge layer 120 causing the at least one outer layer 110 to break starting from the first notch section 112*a* and the second notch section 112*b*.

20. The trim part 100 according to any one of the preceding embodiments, wherein the at least one first break line 122 and/or the at least one second break line 132 has a width in the range from 0 to 1 mm, from 1 mm to 2 mm, from 2 mm to 3 mm, from 3 mm to 4 mm, from 4 mm to 5 mm, or from 5 mm to 6 mm, from 6 mm to 10 mm, or from 0 mm to 20 mm.

21. The trim part 100 according to any one of the preceding embodiments, wherein the airbag is stored in an airbag holding space 180 comprising an opening facing the breakthrough area 134 of the at least one structural layer 130.

22. The trim part 100 according to any one of the preceding embodiments, further comprising a protective layer 160 attached to the at least one structural layer 130 and configured to protect the inflating airbag.

23. The trim part 100 according to embodiment 22, wherein the protective layer 160 comprises polyvinyl chloride PVC, poly-vinyl siloxane PVS, polytetrafluoroethylene PTFE, polyoxymethylene copolymer POM-C.

24. The trim part 100 according to any one of the preceding embodiments, wherein the trim part 100 is configured to be arranged inside a vehicle, specifically in a motor vehicle, more specifically in a passenger vehicle, in order to protect the one or more occupants in the event of an accident.

25. The trim part 100 according to embodiment 24, wherein no decorative layer, specifically no upholstered decorative layer, on a second surface of the at least one outer layer 110 facing away from the at least one hinge layer 120 is required to conceal the at least one first break line 122.

26. The trim part 100 according to embodiment 24 or 25, wherein the trim part 100 is part of a side door 170, a pillar, and/or a dashboard of the vehicle.

27. The trim part 100 according to embodiments 24, 25, or 26, further comprising attachment means configured to allow the trim part 100 to be arranged inside the vehicle.

28. A method 200 for manufacturing a trim part 100, in particular for covering an airbag in a vehicle, comprising
providing 210 a mould;
forming 220 a layer stack, comprising:
    placing 221 at least one outer layer 110 into the mould;
    placing 222 at least one hinge layer 120 comprising at least one first break line 122 which forms a first part of a perimeter of a flap area 124 on top of the at least one outer layer 110;
    placing 223 at least one structural layer 130 on top of the at least one hinge layer 120;
inserting 230 the layer stack into a vacuum bag;
connecting 240 one or more resin tubes to the vacuum bag;
inserting 250 the vacuum bag into an autoclave machine;
applying 260 a predetermined pressure to the vacuum bag and heating 270 the vacuum bag to a predetermined temperature;
providing 280 a vacuum inside the vacuum bag and enabling 290 a flow of resin into the vacuum bag; and
removing 300 the trim part 100 out of the vacuum bag, characterized in that
at least one of the at least one outer layer 110 comprises fiber composite material and the at least one structural layer 130 comprises at least one second break line 132 forming a breakthrough area 134 corresponding to the flap area 124 of the at least one hinge layer 120.

29. The method 200 according to embodiment 28, further comprising bonding 310 a protective layer 160 on top of the at least one structural layer 130.

30. The method 200 according to embodiment 29, wherein the protective layer 160 comprises polyvinyl chloride PVC, poly-vinyl siloxane PVS, polytetrafluoroethylene PTFE, polyoxymethylene copolymer POM-C.

What is claimed is:
1. A trim part for covering an airbag in a vehicle, comprising:
at least one outer layer;
at least one hinge layer comprising at least one first break line which forms a first part of a perimeter of a flap area and is attached to a first surface of the at least one outer layer;

at least one structural layer attached to a first surface of the at least one hinge layer facing away from the at least one outer layer;

at least one of the at least one outer layer comprises a fiber composite material;

wherein the at least one structural layer comprises at least one second break line forming a breakthrough area corresponding to the flap area of the at least one hinge layer;

wherein the at least one outer layer is configured to be broken through by the flap area when a force is applied to the flap area, wherein the force is applied by an inflating airbag;

wherein the at least one outer layer, the at least one hinge layer, and the at least one structural layer are bonded to each other in such a way that the trim part is a homogeneous part;

wherein the at least one of the at least one outer layer comprising the fiber composite material is configured to serve as a visual decorative layer;

wherein a second part of the perimeter of the flap area which is not formed by the at least one first break line is configured to serve as rotation axis for the flap area;

wherein a first portion of the at least one second break line is aligned with the first part of the perimeter of the flap area formed by the at least one first break line, and a second portion of the at least one second break line is aligned with the second part of the perimeter of the flap area which is not formed by the at least one first break line.

2. The trim part according to claim 1, wherein the fiber composite material of the at least one of the at least one outer layer comprises visible carbon.

3. The trim part according to claim 1, wherein a number of the at least one outer layer is at least two, and a first outer layer comprises carbon fibers and is configured to serve as a visual decorative layer and a second outer layer comprises at least one of Kevlar, natural fiber, polymer fiber, carbon fibers, aramid, or a combination thereof.

4. The trim part according to claim 1, wherein the at least one hinge layer comprises at least one of metal, Kevlar, natural fiber, polymer fiber, nylon, fabric material, aramid, or a combination thereof.

5. The trim part according to claim 4, further comprising a corrosion prevention layer attached to the first surface and/or a second surface opposite the first surface of the at least one hinge layer, in particular when the at least one hinge layer comprises metal.

6. The trim part according to claim 5, wherein the at least one structural layer comprises carbon fibers.

7. The trim part according to claim 6, wherein a portion of the at least one structural layer is configured to focus energy on the flap area in order to break through the outer layer when the airbag is inflated, wherein the portion of the at least one structural layer comprises a strength that is higher than the strength of a remaining part of the structural layer in order to pass energy of the inflating airbag to the hinge layer.

8. The trim part according to claim 7, wherein the at least one first break line of the at least one hinge layer comprises a first partial break line and a second partial break line parallel to the first partial break line, wherein the first partial break line is separated from the second partial break line by a fold line along a rotational axis, and extends vertically therefrom, wherein the at least one outer layer includes a first notch section aligned to a top portion of the first partial break line and a second notch section aligned to a top portion of the second partial break line, wherein the force applied by the inflating airbag opens the flap area of the at least one hinge layer causing the at least one outer layer to break starting from the first notch section and the second notch section.

9. The trim part according to claim 8, wherein the airbag is stored in an airbag holding space comprising an opening facing the breakthrough area of the at least one structural layer.

10. The trim part according to claim 9, further comprising a protective layer attached to the at least one structural layer and configured to protect the inflating airbag.

11. The trim part according to claim 1, wherein a perimeter of the breakthrough area comprises the first portion of the at least one second break line and the second portion of the at least one second break line, and the perimeter of the breakthrough area is aligned with the perimeter of the flap area.

12. The trim part according to claim 1, wherein a contour of the breakthrough area corresponds to a contour of the flap area, such that the force applied by the inflating airbag is transferred to the flap area over the breakthrough area.

13. A method for manufacturing a trim part for covering an airbag in a vehicle, the method comprising:
providing a mould;
forming a layer stack, comprising:
placing at least one outer layer into the mould;
placing at least one hinge layer comprising at least one first break line which forms a first part of a perimeter of a flap area on top of the at least one outer layer; and
placing at least one structural layer on top of the at least one hinge layer;
inserting the layer stack into a vacuum bag;
connecting one or more resin tubes to the vacuum bag;
inserting the vacuum bag into an autoclave machine;
applying a predetermined pressure to the vacuum bag and heating the vacuum bag to a predetermined temperature;
providing a vacuum inside the vacuum bag and enabling a flow of resin into the vacuum bag; and
removing the trim part out of the vacuum bag;
wherein at least one of the at least one outer layer comprises fiber composite material and the at least one structural layer comprises at least one second break line forming a breakthrough area corresponding to the flap area of the at least one hinge layer;
wherein the at least one outer layer, the at least one hinge layer, and the at least one structural layer are bonded to each other in such a way that the trim part is a homogeneous part;
wherein a second part of the perimeter of the flap area which is not formed by the at least one first break line is configured to serve as rotation axis for the flap area;
wherein a first portion of the at least one second break line is aligned with the first part of the perimeter of the flap area formed by the at least one first break line, and a second portion of the at least one second break line is aligned with the second part of the perimeter of the flap area which is not formed by the at least one first break line.

14. The method according to claim 13, further comprising bonding a protective layer on top of the at least one structural layer.

15. A trim part for covering an airbag in a vehicle, the trim part comprising:
at least one outer layer;

at least one hinge layer forming at least a part of a flap area and being attached to a first surface of the at least one outer layer;

at least one structural layer attached to a first surface of the at least one hinge layer facing away from the at least one outer layer;

wherein at least one of the at least one outer layer comprises a fiber composite material; wherein the at least one structural layer comprises at least one break line forming a breakthrough area corresponding to the flap area of the at least one hinge layer;

wherein the at least one outer layer is configured to be broken through by the flap area when a force is applied to the flap area, wherein the force is applied by an inflating airbag;

wherein the at least one outer layer, the at least one hinge layer, and the at least one structural layer are bonded to each other in such a way that the trim part is a homogeneous part;

wherein a contour of the breakthrough area is aligned with a contour of the flap area, such that the force applied by the inflating airbag is transferred to the flap area over the breakthrough area.

16. The trim part according to claim 15, wherein the fiber composite material of the at least one of the at least one outer layer comprises visible carbon.

17. The trim part according to claim 15, wherein a number of the at least one outer layer is at least two, and a first outer layer comprises carbon fibers and is configured to serve as a visual decorative layer and a second outer layer comprises at least one of Kevlar, natural fiber, polymer fiber, carbon fibers, aramid, or a combination thereof.

18. The trim part according to claim 15, wherein the at least one hinge layer comprises at least one of metal, Kevlar, natural fiber, polymer fiber, nylon, fabric material, aramid, or a combination thereof.

19. The trim part according to claim 15, wherein the at least one structural layer comprises carbon fibers.

20. The trim part according to claim 19, wherein a portion of the at least one structural layer is configured to focus energy on the flap area in order to break through the outer layer when the airbag is inflated, wherein the portion of the at least one structural layer comprises a strength that is higher than the strength of a remaining part of the structural layer in order to pass energy of the inflating airbag to the hinge layer.

* * * * *